US007454183B2

(12) United States Patent
Moorti et al.

(10) Patent No.: US 7,454,183 B2
(45) Date of Patent: *Nov. 18, 2008

(54) METHOD AND SYSTEM FOR ANTENNA SELECTION DIVERSITY WITH DYNAMIC GAIN CONTROL

(75) Inventors: Rajendra Tushar Moorti, Mountain View, CA (US); Min Chuin Hoo, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 333 days.

This patent is subject to a terminal disclaimer.

(21) Appl. No.: 10/810,462

(22) Filed: Mar. 26, 2004

(65) Prior Publication Data

US 2005/0215214 A1  Sep. 29, 2005

Related U.S. Application Data

(62) Division of application No. 60/547,366, filed on Feb. 24, 2004.

(51) Int. Cl.
*H04B 7/00* (2006.01)

(52) U.S. Cl. .................. 455/277.1; 455/277.2; 455/275; 375/349; 375/347; 375/267

(58) Field of Classification Search ............... 455/193.1, 455/277.1, 277.2, 278.1–280, 78, 239.1–251.2, 455/226.3, 226.4, 226.2, 115.2, 115.3, 115.4, 455/134, 101, 135, 132, 133, 562.1, 561, 455/424, 425, 456.5, 456.6, 550.1, 575.1, 455/226.1, 232.1, 269, 504, 65, 67.11, 273, 455/275, 276.1; 375/343, 347, 132, 146, 375/349, 267, 345, 334, 224, 144, 148; 343/795, 343/770, 816, 850, 904, 876, 893, 702, 700, 343/853, 713, 895, 720
See application file for complete search history.

(56) References Cited

U.S. PATENT DOCUMENTS

| 5,481,571 | A  | * | 1/1996  | Balachandran et al. ....... 375/347 |
| 5,648,992 | A  | * | 7/1997  | Wright et al. ................ 375/347 |
| 5,787,122 | A  | * | 7/1998  | Suzuki ........................ 375/267 |
| 5,940,454 | A  | * | 8/1999  | McNicol et al. .............. 375/347 |
| 6,002,672 | A  | * | 12/1999 | Todd ........................... 370/252 |
| 6,049,705 | A  | * | 4/2000  | Xue ........................... 455/277.1 |
| 6,922,549 | B2 | * | 7/2005  | Lyons et al. .............. 455/67.13 |
| 2002/0168039 | A1 | * | 11/2002 | Miyanaga et al. ........... 375/347 |
| 2004/0137924 | A1 | * | 7/2004  | Herscovich et al. ......... 455/500 |

* cited by examiner

*Primary Examiner*—Edward Urban
*Assistant Examiner*—Charles Chow
(74) *Attorney, Agent, or Firm*—McAndrews, Held & Malloy, Ltd

(57) ABSTRACT

A method and system for antenna selection diversity with dynamic gain control. A receiver selects a starting antenna and dwells on it until an incoming signal is detected. An AGC is applied on the received signal and an estimate of the received power is determined for the starting antenna. The receiver may dwell on other antennas if the signal in the first antenna is not strong enough for signal processing. The gain of an antenna may be set by the gain and power levels of the previously dwelled-on antennas and/or by a power coupling factor that exists between the antennas in an antenna switch. The receiver switches through the remaining antennas as long as necessary to select at least one of the antennas for signal processing. Dynamically adjusting the gain of antennas in a diversity system provides a more accurate and efficient antenna selection scheme.

54 Claims, 6 Drawing Sheets

METHOD AND SYSTEM FOR ANTENNA SELECTION DIVERSITY WITH DYNAMIC GAIN CONTROL

CROSS-REFERENCE TO RELATED APPLICATIONS/INCORPORATION BY REFERENCE

This application makes reference to, claims priority to, and claims the benefit of U.S. Provisional Application Ser. No. 60/547,366 filed Feb. 24, 2004.

This application makes reference to:
U.S. Utility application Ser. No. 10/810,433 filed Mar. 26, 2004.
U.S. Utility application Ser. No. 10/810,186 filed Mar. 26, 2004.
U.S. Utility application Ser. No. 10/810,408 filed Mar. 26, 2004.

The above stated applications are hereby incorporated herein by reference in their entirety.

FIELD OF THE INVENTION

Certain embodiments of the invention relate to wireless communication. More specifically, certain embodiments of the invention relate to a method and system for antenna selection diversity with dynamic gain control.

BACKGROUND OF THE INVENTION

In a wireless communication system, a data stream will most likely experience multiple reflections (multipath) while propagating between the transmitter and the receiver. Multipath fading implies that multiple copies of the transmitted signal follow different paths and reach the receiving antenna with different time delays. In such cases the received signal strength at a given time is the result of destructive and constructive interference of the multiple paths arriving from different directions. Destructive interference degrades the performance of the detector and hence adversely affects the system capacity. However, by using multiple antennas at the receiver and with appropriate digital signal processing methods, multipath can be exploited to enhance the performance and robustness of the receiver and to increase the reliability of the communications link. The receiving antennas generally must be spaced sufficiently far apart that the signal each antenna sees is not correlated with the signals seen by the other antennas. One such method of mitigating multipath fading is called selection diversity.

Selection diversity is based on selecting the best signal among plurality of signals detected at the receiver antennas. Let $P_i$ denote the power estimated at antenna i at the receiver. Then, the selection diversity scheme will select antenna j as the receive antenna if $P_j > P_i$, $i \neq j$. Higher accuracy in estimating the powers $P_i$ results in higher probability of the right receive antenna being selected and better performance of the selection diversity scheme. Two main factors that affect the accuracy of the power estimates $P_i$ may include a dwell time on all antennas other than the starting antenna and presence of impairments such as noise, transients and offsets.

With regard to dwell time on all antennas other than the starting antenna, in practical wireless communications systems, time constraints are imposed to keep the transmission overhead low. As a result, the dwell time on all antennas other than the starting antenna is insufficient to allow for automatic gain control (AGC) to run its full course during the dwell time on each antenna. Without automatic gain control, the visibility of the signal strength of all antennas other than the starting antenna is limited and generally leads to inaccurate power estimates $P_i$.

With regard to the presence of impairments such as noise, transients and offsets, impairments corrupt the power estimates $P_i$ and may result in mis-estimations of the received power. Such mis-estimations of power may result in the selection of antenna j as the receive antenna even if $P_j < P_i$ for some other antenna i. Because dwell time on all antennas other than the starting antenna is limited, a predetermined gain may be generally applied to all antennas other than the starting antenna. When the signal in antenna j, where antenna j is not the starting antenna, is very strong, the predetermined gain applied to antenna j may be too high for that signal and the signal may be clipped. If the clipped signal in antenna j was in fact the best received signal available to the receiver, the receiver may end up selecting a signal from antenna i, where $P_i < P_j$, because it may not be able to estimate accurately the power of a signal when it is clipped.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for antenna selection diversity with dynamic gain control. Wireless communication systems may utilize receivers with multiple antennas to enhance the performance and robustness of the receiver and to increase the reliability of the communications link. Certain aspects of the method may comprise dwelling on at least one of several antennas in a receiver system in order to select a portion of those antennas for signal processing, determining a gain, and determining a signal quality metric for the dwelled-on antennas. The power may be an estimated received power or it may be a received power. Selecting the portion of antennas that may be used for signal processing may be based on the gain, the estimated signal quality metric, and/or the received signal quality metric of the dwelled-on antennas.

A starting antenna may be selected from the antennas in the receiver system based on a predetermined criteria, random selection, and/or on information of which dwelled-on antennas or portion of dwelled-on have been selected for signal processing in the past. A starting gain for the starting antenna may be determined by using an automatic gain control. Other antennas in the receiver system may be selected for dwelling based on a predetermined criteria. For each of the dwelled-on antennas, a gain may be determined dynamically based on the gain, the signal quality metrics, and/or on at least one of the power coupling parameters that may be measured between the antenna switch outputs in the receiver. The signal quality metrics may be an estimated received power, a received power, a signal-to-noise ratio, a bit error rate, a packet error rate, a propagation channel characteristic, an/or a channel interference. Selecting a portion of the dwelled-on antennas for signal processing in the current information frame may be based on a comparison against a specified range of levels for at least one signal quality metric.

Another embodiment of the invention may provide a machine-readable storage, having stored thereon, a computer program having at least one code section executable by a machine, thereby causing the machine to perform the steps as described above for a method and system for antenna selection diversity with dynamic gain control.

Certain aspects of the system may comprise a processor that dwells on at least one several antennas in a receiver system in order to select a portion of those antennas for signal processing. The processor determines a gain and a signal quality metric for the dwelled-on antennas. The signal quality metric may be an estimated signal quality metric or it may be a true signal quality metric. The processor selects the portion of antennas that may be used for signal processing based on the gain, the estimated signal quality metric, and/or the received signal quality metric of the dwelled-on antennas.

The processor may select a starting antenna from the antennas in the receiver system based on a predetermined criteria, random selection, and/or on information of which dwelled-on antennas or portion of dwelled-on have been selected for signal processing in the past. The processor may determine a starting gain for the starting antenna by using an automatic gain control.

The processor may select the dwelling antennas in the receiver system based on a predetermined criteria. For each of the dwelled-on antennas, the processor may determine a gain dynamically based on the gain, the estimated received power, and/or the received power of other dwelled-on antennas and/or on at least one of the power coupling parameters that may be measured between the antennas in the receiver. The processor may select a portion of the dwelled-on antennas for signal processing in the current information frame based on a comparison against a specified range of levels for at least one signal quality metric, and may select the dwelling antennas in the receiver system based on a predetermined criteria. For each of the dwelled-on antennas, the processor may determine a gain dynamically based on the gain, the estimated received power, and/or the received power of other dwelled-on antennas and/or on at least one of the power coupling parameters that may be measured between the antennas in the receiver. The processor may select a portion of the dwelled-on antennas for signal processing in the current information frame based on a comparison against a specified range of levels for at least one signal quality metric.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for antenna selection diversity with dynamic gain control. Wireless communication systems may utilize receivers with multiple antennas to enhance the performance and robustness of the receiver and to increase the reliability of the communications link. Certain aspects of the method may comprise dwelling on at least one of several antennas in a receiver system in order to select a portion of those antennas for signal processing, determining a gain, and determining a signal quality metric for the dwelled-on antennas. The power may be an estimated received power or it may be a received power. Selecting the portion of antennas that may be used for signal processing may be based on the gain, the estimated signal quality metric, and/or the received signal quality metric of the dwelled-on antennas.

A starting antenna may be selected from the antennas in the receiver system based on a predetermined criteria, random selection, and/or on information of which dwelled-on antennas or portion of dwelled-on have been selected for signal processing in the past. A starting gain for the starting antenna may be determined by using an automatic gain control.

Other antennas in the receiver system may be selected for dwelling based on a predetermined criteria. For each of the dwelled-on antennas, a gain may be determined dynamically based on the gain, the signal quality metrics, and/or on at least one of the power coupling parameters that may be measured between the antenna switch outputs in the receiver. The signal quality metrics may be an estimated received power, a received power, a signal-to-noise ratio, a bit error rate, a packet error rate, a propagation channel characteristic, an/or a channel interference. Selecting a portion of the dwelled-on antennas for signal processing in the current information frame may be based on a comparison against a specified range of levels for at least one signal quality metric.

Figure 1A:
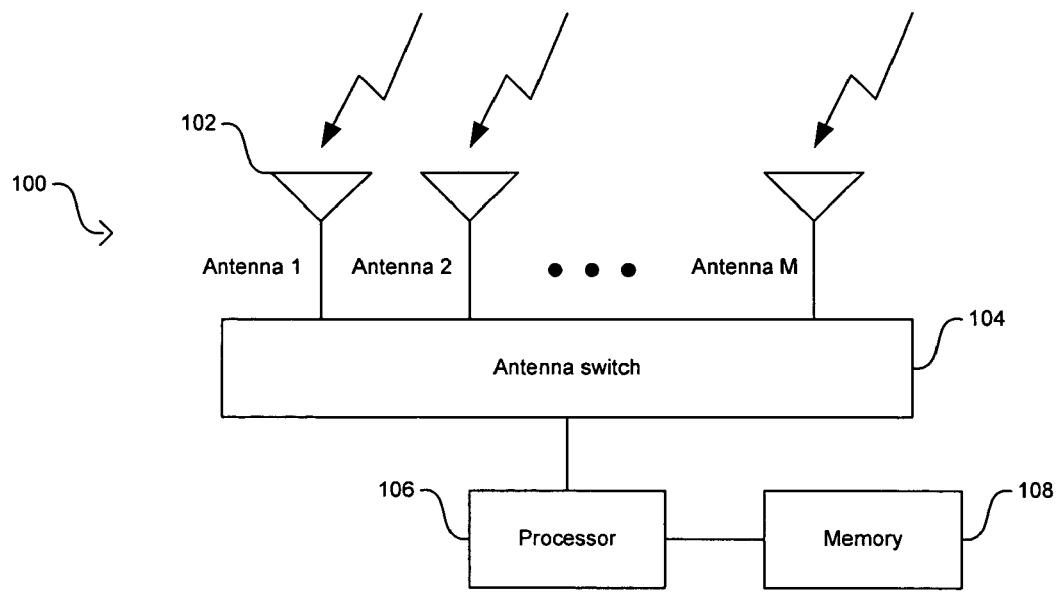
FIG. 1A is a diagram of an exemplary receiver system that may be utilized in connection with selection diversity with dynamic gain control, in accordance with an embodiment of the invention.

FIG. 1A is a diagram of an exemplary receiver system that may be utilized in connection with selection diversity with dynamic gain control, in accordance with an embodiment of the invention. Referring to FIG. 1A, the receiver system 100 may comprise at least one antenna 102, an antenna switch 104, a processor 106, and a memory 108. There may be as many as M antennas 102 coupled to the antenna switch 104. The antenna 102 may be part of an independent antenna array of antennas coupled to the antenna switch 104, may be one of several individual antennas coupled to the antenna switch 104, and/or may be one of several integrated individual antennas and/or may be part of an integrated array of antennas coupled to the antenna switch 104. The antenna switch 104 may be a mechanical, electronic, electromechanical, and/or microelectromechanical (MEM) switch. The processor 102 may be a hardware resource, a core processor, a coprocessor, a digital signal processor, or a microcontroller. The memory 108 may be an external memory, an embedded memory, a shared memory, or a main memory. The memory 108 may be an SRAM and/or DRAM type memory.

The incoming wireless signal may be received by at least one antenna 102. The antenna switch 104 may select the antenna channel of any antenna 102. The processor 106 may notify the antenna switch 104 which antenna channel corresponding to a particular antenna 102 to select. The processor 106 may be utilized to determine which antenna 102 may be the starting antenna, to determine which antenna 102 to select next, to determine the dwell time in each selected antenna, to detect and decode the incoming signal, and to amplify or apply a gain to the signal. The processor 106 may apply gain to the signal from an antenna channel by utilizing an automatic gain control (AGC) or by determining a specific gain to apply. The processor 106 may be utilized to determine the estimated power of the signal, to determine a signal-to-noise ratio, to determine a packet-error-rate or bit-error-rate, to transfer information to and from memory 108, and to determine statistics based on information from several transmitted frames stored in memory 108. The memory 108 may be utilized to store information processed by the processor 106 that may be associated with any antenna 102 in any number of transmitted frames.

In operation, the processor 106 may notify the antenna switch 104 which antenna 102 may be used as the starting antenna. The processor 106 may determine which antenna 102 to use for the starting antenna based on information from preceding frames that may be stored in memory 108. The antenna switch 104 may select the antenna channel that corresponds to the selected antenna 102. The processor 106 may dwell on the starting antenna until it detects an incoming signal. Once the signal is detected, an AGC may be applied to obtain a sufficiently strong signal for decoding. The processor 106 may determine the estimated received power for the starting antenna and may store the value in memory 108. The processor 106 may then notify the antenna switch 104 to select the next antenna 102 for detection. The processor 106 may determine which antenna 102 to use as the next antenna based on information from preceding frames that may be stored in memory 108. The antenna switch 104 may select the antenna channel that corresponds to the next antenna. The processor 106 may dwell on the next antenna and apply a predetermined gain because the dwell time may be insufficient for an AGC to run its full operation. The processor 106 may determine the estimated received power for the next antenna and may store the value in memory 108. A similar procedure may be carried out with the remaining antennas in receiver system 100. Wit the exception of the starting antenna, a predetermined gain may be applied to all the other antennas because dwell time in all but the starting antenna is limited. The processor 106 may determine an estimated received power for all antennas in receiver system 100 and store the values in memory 108. The processor 106 may select the best antenna for decoding by selecting the highest estimated received power to determine the antenna 102 which has the strongest signal. The processor 106 may then notify the antenna switch 104 to select the antenna channel that corresponds to the antenna 102 with the strongest signal for decoding. The processor 106 may then detect and decode the signal from the selected best antenna and may store information associated with the antenna 102 it selected as the best antenna for the current frame.

Figure 1B:
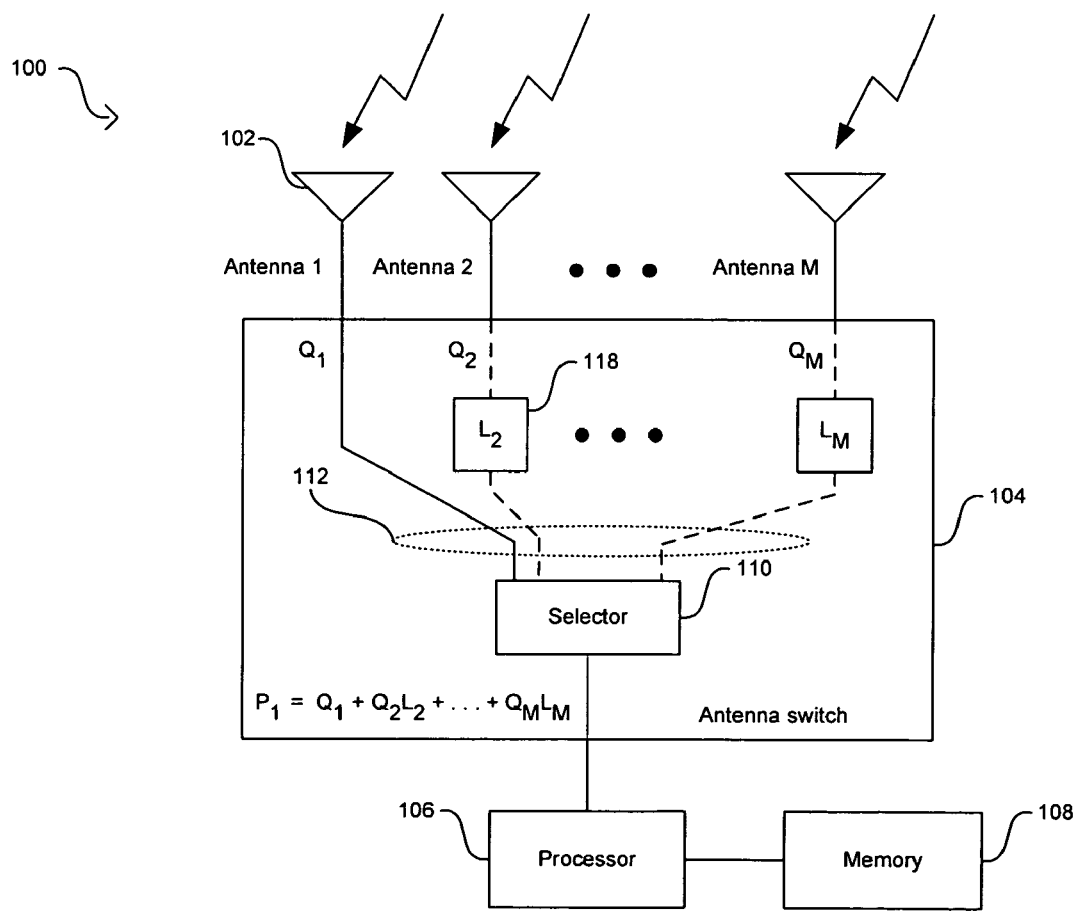
FIG. 1B is a diagram of an exemplary antenna switch in a receiver system that may be utilized with selection diversity with dynamic gain control, in accordance with an embodiment of the invention.

FIG. 1B is a diagram of an exemplary antenna switch in a receiver system that may be utilized with selection diversity with dynamic gain control, in accordance with an embodiment of the invention. Referring to FIG. 1B, in this exemplary diagram, the selector 110 in antenna switch 104 may be configured to connect antenna 1 to processor 106. In this case, the incident power $Q_1$ in antenna 1 is received by processor 106. Moreover, because the isolation between antenna channels 112 in antenna switch 104 is not perfect, in this configuration the processor 106 may also receive, when detecting a signal in antenna 1, part of the incident powers $Q_2$ through $Q_M$ received by antennas 2 through M. The amount of each incident power $Q_2$ through $Q_M$ from antennas 2 through M received by processor 106 when detecting a signal in antenna 1 may be attenuated by power coupling factors 118 $L_2$ through $L_M$. The factors $L_2$ through $L_M$ correspond to the proportion of the incident powers received by antennas 2 through M that will show in the antenna channel 112 of antenna 1 because of the imperfect isolation in antenna switch 104. The total estimated power received by processor 106 from antenna 1 is $P_1 = Q_1 + Q_2 L_2 + \ldots + Q_M L_M$.

For illustration, when $Q_1 << Q_i L_i$, $i \neq 1$ and that $Q_2 L_2$ is dominant, the estimated received power received by processor 106 may reduced to $P_1 = Q_2 L_2$. In this case, a maximum power of interest at antenna 2 may be given by $P_1 / L_2$, which is the estimated received power of antenna 1 divided by a measured power coupled factor between antennas 1 and 2. Therefore, the gain setting found for antenna 1 by the AGC through a long dwell time may be backed-off for use in antenna 2 to allow for a signal whose power is as large as $P_1 / L_2$ to be detected properly at antenna 2. The gain for antenna 2 may not need to be predetermined but may be dynamically adjusted in each received frame. Repeating the same exercise for cases where $Q_3 L_3, \ldots,$ or $Q_M L_M$ dominates, the maximum power of interest is $P_1 / L_j$, where $L_j = \max(L_i, i \neq 1)$ is the power coupling factor 118 for antenna j. Since $L_j$ is known, backing-off the gain setting found for antenna 1 to allow for $P_1 / L_j$ to be detected properly at antenna j may also allow for $P_1 / L_i$, $i \neq j$, 1 to be detected properly at antenna i. The gain setting for all antennas other than the starting antenna may be dynamically set as it is backed-off from the gain setting found for antenna 1. If there is sufficient time, the gain back-off may be implemented in more than one step. In this regard, a time required to finish dynamic gain control is much less than a time required to run a full automatic gain control (AGC) on each of the antenna channels in receiver system 100.

Figure 2A:
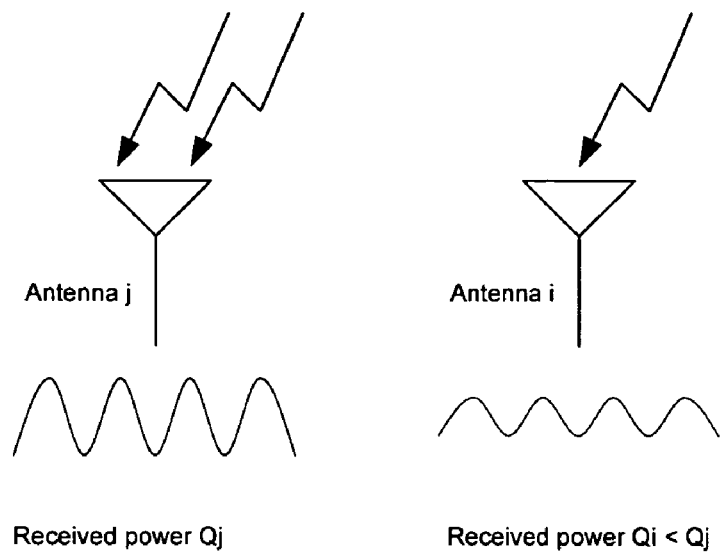
FIG. 2A illustrates exemplary received powers by different antennas in a receiver system, in accordance with an embodiment of the invention.

FIG. 2A illustrates exemplary received powers by different antennas in a receiver system, in accordance with an embodiment of the invention. Referring to FIG. 2A, in this exemplary illustration the receiver system 100 may be a two antenna system comprising antenna j and antenna i. The receiver system 100 may determine whether antenna j or antenna i may be selected as the best antenna for decoding the incoming frame or packet information. Antenna j receives a stronger received power than antenna i ($Q_i < Q_j$) and therefore receiver system 100 should select antenna j for signal decoding.

Figure 2B:
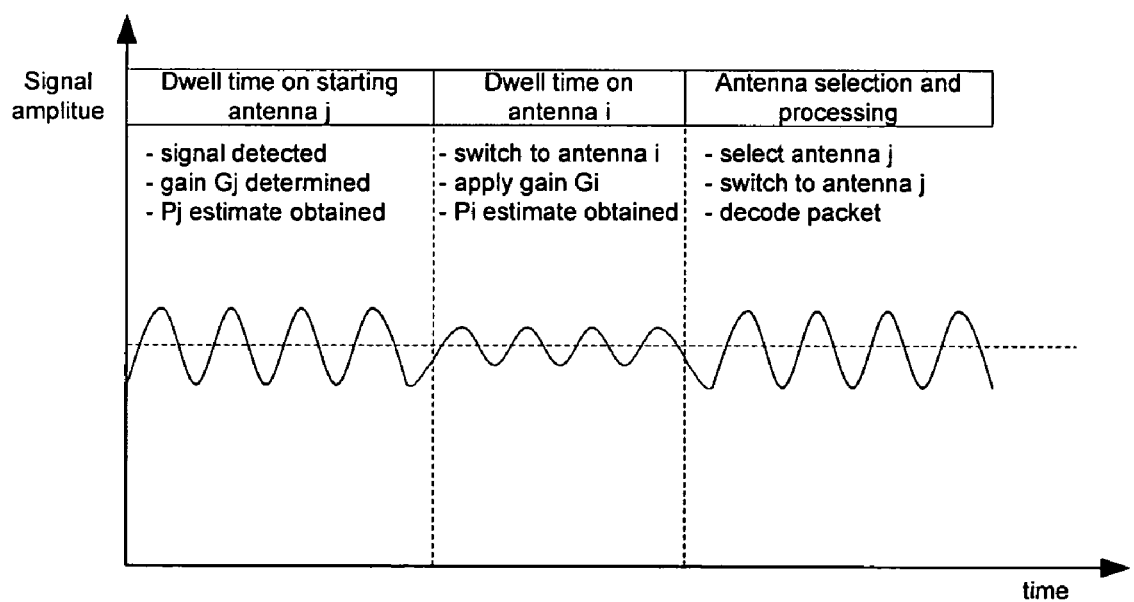
FIG. 2B illustrates exemplary antenna dwell times, signal gain, and antenna selection in a receiver system in connection with selection diversity with dynamic gain control, in accordance with an embodiment of the invention.

FIG. 2B illustrates exemplary antenna dwell times, signal gain, and antenna selection in a receiver system in connection with selection diversity with dynamic gain control, in accordance with an embodiment of the invention. Referring to FIG. 2B, the receiver system 100, in determining whether it should select antenna j or antenna i in FIG. 2A for signal decoding, may first dwell on antenna j, if antenna j was selected as the starting antenna. Once the signal is detected, the gain $G_j$ may be determined for antenna j. The processor 106 may determine an estimated received power $P_j$ for antenna j. The processor 106 may then dwell on antenna i by notifying the antenna switch 104 to select antenna i for detection. The gain $G_i$ for antenna i may be set to correspond to the gain $G_j$ or lower for antenna j or to a predetermined value. In that case, the processor 106 may determine an estimated received power for antenna i that may be lower than the estimated received power for antenna j. After dwelling on both antenna j and antenna i, the processor 102 may correctly select antenna j as the one with the strongest signal, notify the antenna switch 104 to select antenna j, and use the signal from antenna j for decoding the packet being received in the current information frame. As long as the antenna with the strongest signal is the same as the antenna that the receiver system 100 selects as the starting antenna, setting the gain of all following antennas to correspond to the gain of the first antenna may result in the correct antenna selection.

Figure 3A:
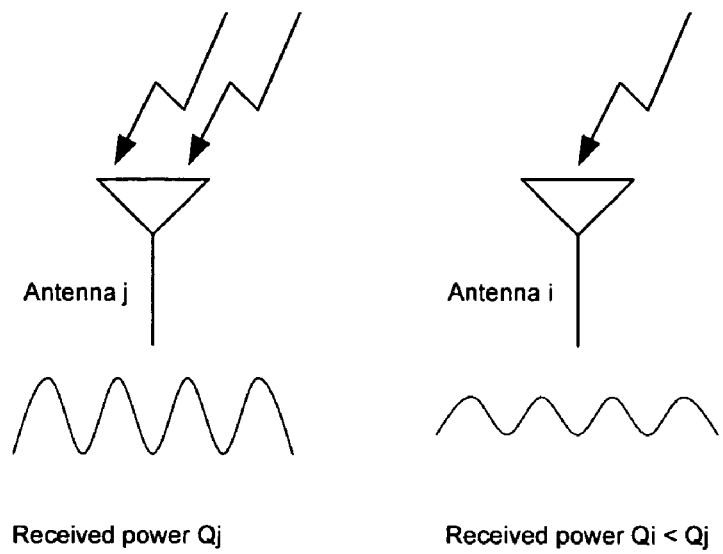
FIG. 3A illustrates exemplary received powers by different antennas in a receiver system, in accordance with an embodiment of the invention.

FIG. 3A illustrates exemplary received powers by different antennas in a receiver system, in accordance with an embodiment of the invention. Referring to FIG. 3A, in this exemplary illustration the receiver system 100 may be a two antenna system comprising antenna j and antenna i. The receiver system 100 may determine whether antenna j or antenna i may be selected as the best antenna for decoding the incoming frame or packet information. Antenna j receives a stronger received power than antenna i ($Q_i < Q_j$) and therefore receiver system 100 should select antenna j for signal decoding.

Figure 3B:
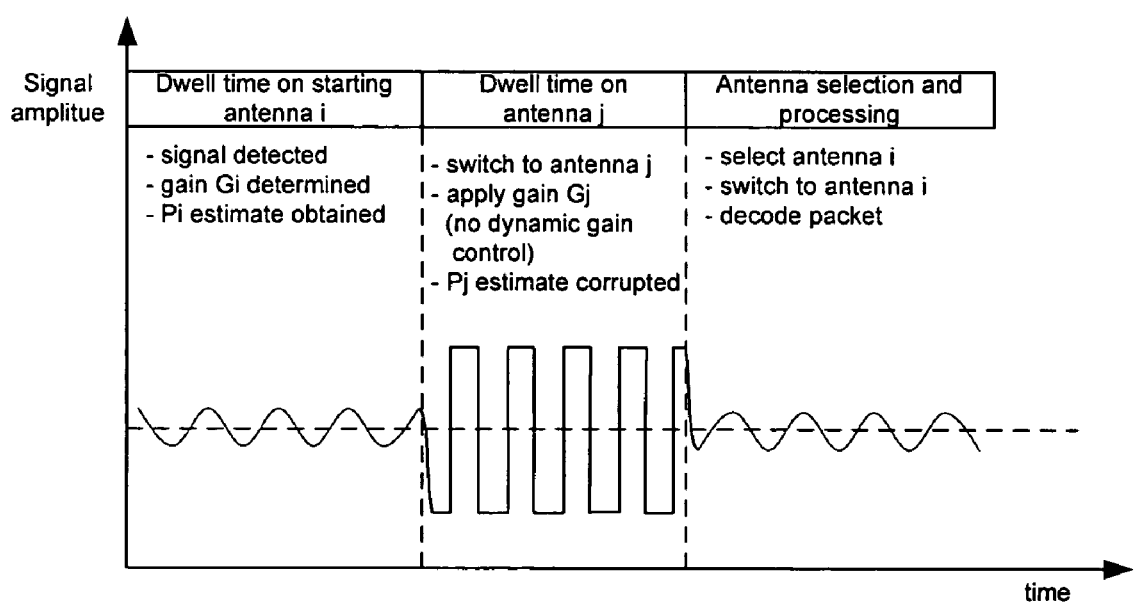
FIG. 3B illustrates exemplary antenna dwell times, signal clipping, and antenna selection in a receiver system in connection with selection diversity with dynamic gain control, in accordance with an embodiment of the invention.

FIG. 3B illustrates exemplary antenna dwell times, signal clipping, and antenna selection in a receiver system in connection with selection diversity with dynamic gain control, in accordance with an embodiment of the invention. Referring to FIG. 3B, the receiver system 100, in determining whether it should select antenna j or antenna i in FIG. 3A for signal decoding, may first dwell on antenna i, if antenna i was selected as the starting antenna. Once the signal is detected, the gain $G_i$ may be determined for antenna i. The processor 106 may determine an estimated received power $P_i$ for antenna i. The processor 106 may then dwell on antenna j by notifying the antenna switch 104 to select antenna j for detection. The gain $G_j$ for antenna j may be set to correspond to the gain $G_i$ for antenna i or to a predetermined value. Such case may occur, for example, if dynamic gain adjustment only uses the gain of antenna i and does not use other signal quality metrics in setting the gain in antenna j. Because the signal in antenna i may be weaker than that in antenna j, if the gain $G_j$ for antenna j is set to correspond to the gain $G_i$ or larger, the signal in antenna j may be clipped and processor 106 may not be able to accurately determine the estimated received power $P_j$ for antenna j. The processor 106 may drop antenna j because it could not determine its estimated received power and may select antenna i for signal decoding. By setting the gain in all following antennas after the starting antenna to correspond to a reduced portion of the gain of the starting antenna, the receiver system 100 may avoid signal saturation and be able to select the correct antenna for signal decoding.

Figure 3C:
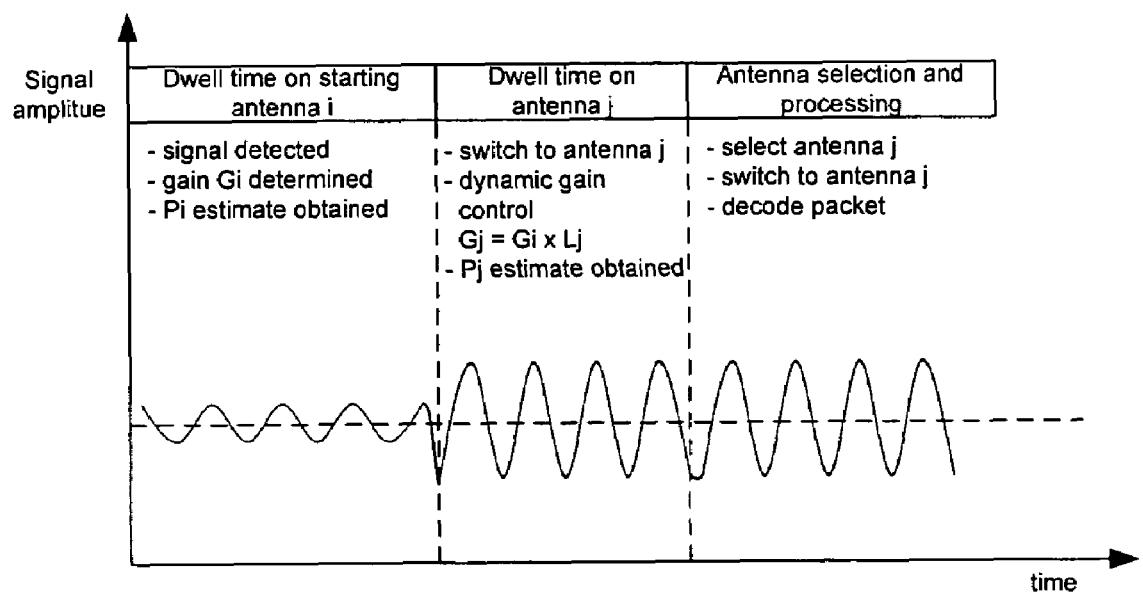
FIG. 3C illustrates exemplary antenna dwell times, dynamic gain control, and antenna selection, in accordance with an embodiment of the invention.

FIG. 3C illustrates exemplary antenna dwell times, dynamic gain control, and antenna selection, in accordance with an embodiment of the invention. Referring to FIG. 3C, the receiver system may dynamically control the gain $G_j$ to be applied to antenna j by applying a gain $G_i L_j$, where $L_j$ is the power coupling factor between antenna j and antenna i. The coupling power factor $L_j$ may be used to reduce the gain and to guarantee that signal saturation may not result in the incorrect selection of the best antenna for signal decoding. Because the coupling power factors 118 may be known from the antenna switch 104 specification or may be measured prior to the operation of receiver system 100, they may be stored in memory 108 and may be used by the processor 106 to dynamically control the gain in all following antennas after the starting antenna. The processor 106 may apply a gain $G_s L_j$, where $G_s$ corresponds to the gain of the starting antenna, whichever one may be selected as the starting antenna by processor 106, and $L_j$ corresponds to the power coupling factor between the current dwelling antenna j and the starting antenna. When the processor dwells on a following antenna k, and the estimated received power of antenna k corresponds to the strongest signal, the processor 106 may select antenna k as the best antenna and may apply a gain $G_k L_i$ to antenna i, where $G_k$ corresponds to the gain of antenna k and $L_i$ corresponds to the power coupling factor between the current dwelling antenna i and the best antenna or antenna k.

Figure 4A:
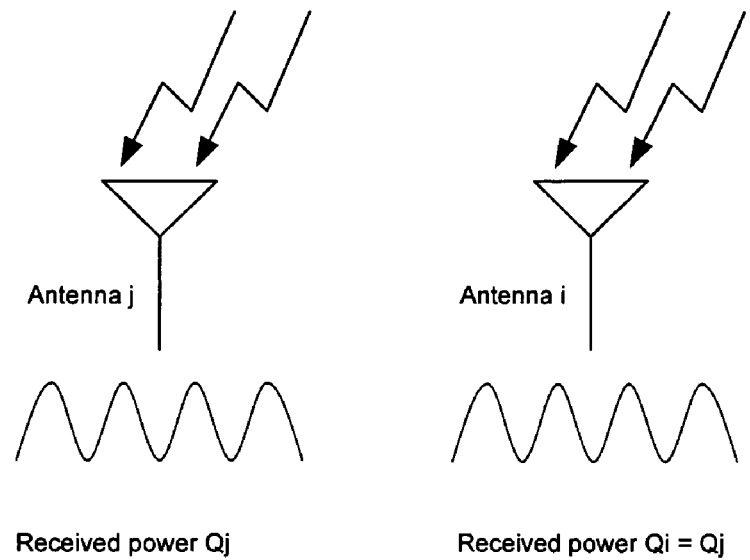
FIG. 4A illustrates exemplary received powers by different antennas in a receiver system, in accordance with an embodiment of the invention.

FIG. 4A illustrates exemplary received powers by different antennas in a receiver system, in accordance with an embodiment of the invention. Referring to FIG. 4A, in this exemplary illustration the receiver system 100 may be a two antenna system comprising antenna j and antenna i. The receiver system 100 may determine whether antenna j or antenna i may be selected as the best antenna for decoding the incoming frame or packet information. Antenna j and antenna i receive the same incoming power ($Q_i = Q_j$) and therefore receiver system 100 may select either antenna j or antenna i for signal decoding.

Figure 4B:
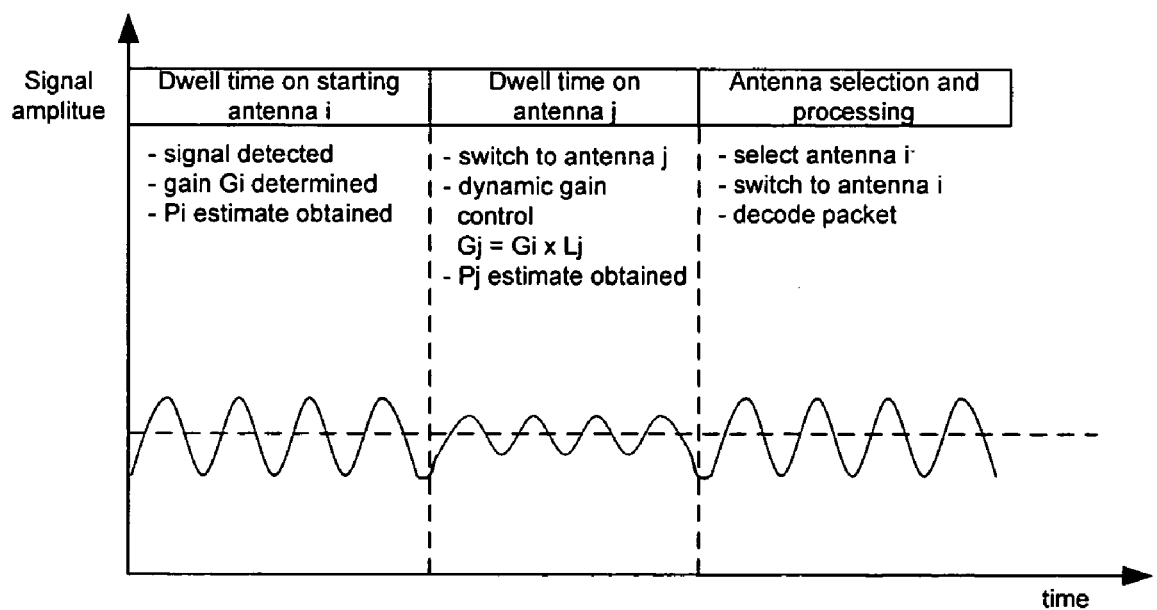
FIG. 4B illustrates exemplary antenna dwell times, dynamic gain control, and antenna selection, in accordance with an embodiment of the invention.

FIG. 4B illustrates exemplary antenna dwell times, dynamic gain control, and antenna selection, in accordance with an embodiment of the invention. Referring to FIG. 4B, the receiver system 100, in determining whether it should select antenna j or antenna i in FIG. 4A for signal decoding, may first dwell on antenna i, if antenna i was selected as the starting antenna. Once the signal is detected, an AGC is applied to antenna i to determine the gain $G_i$ for antenna i. The processor 106 may determine an estimated received power $P_i$ for antenna i after the AGC has settled. The processor 106 may then dwell on antenna j by notifying the antenna switch 104 to select antenna j for detection. The gain $G_j$ for antenna j may be set by processor 106 to correspond to $G_i L_j$, where $G_i$ corresponds to the gain of antenna i and $L_j$ corresponds to the power coupling factor between antenna j and antenna i. While the processor 106 may compensates for the lower applied gain in antenna j and may determine that the received power is the same in both antenna j and antenna i, the processor 106 may select antenna i over antenna j in this case because antenna j may be more susceptible than antenna i to transients signals, to capacitative or inductive coupling, and/or to other noise sources. Because the starting antenna may generally have longer dwelling times and an AGC may be used, the starting antenna may, in general, be less susceptible than other antennas to transients signals, to capacitative or inductive coupling, and/or to other noise sources.

Figure 5:
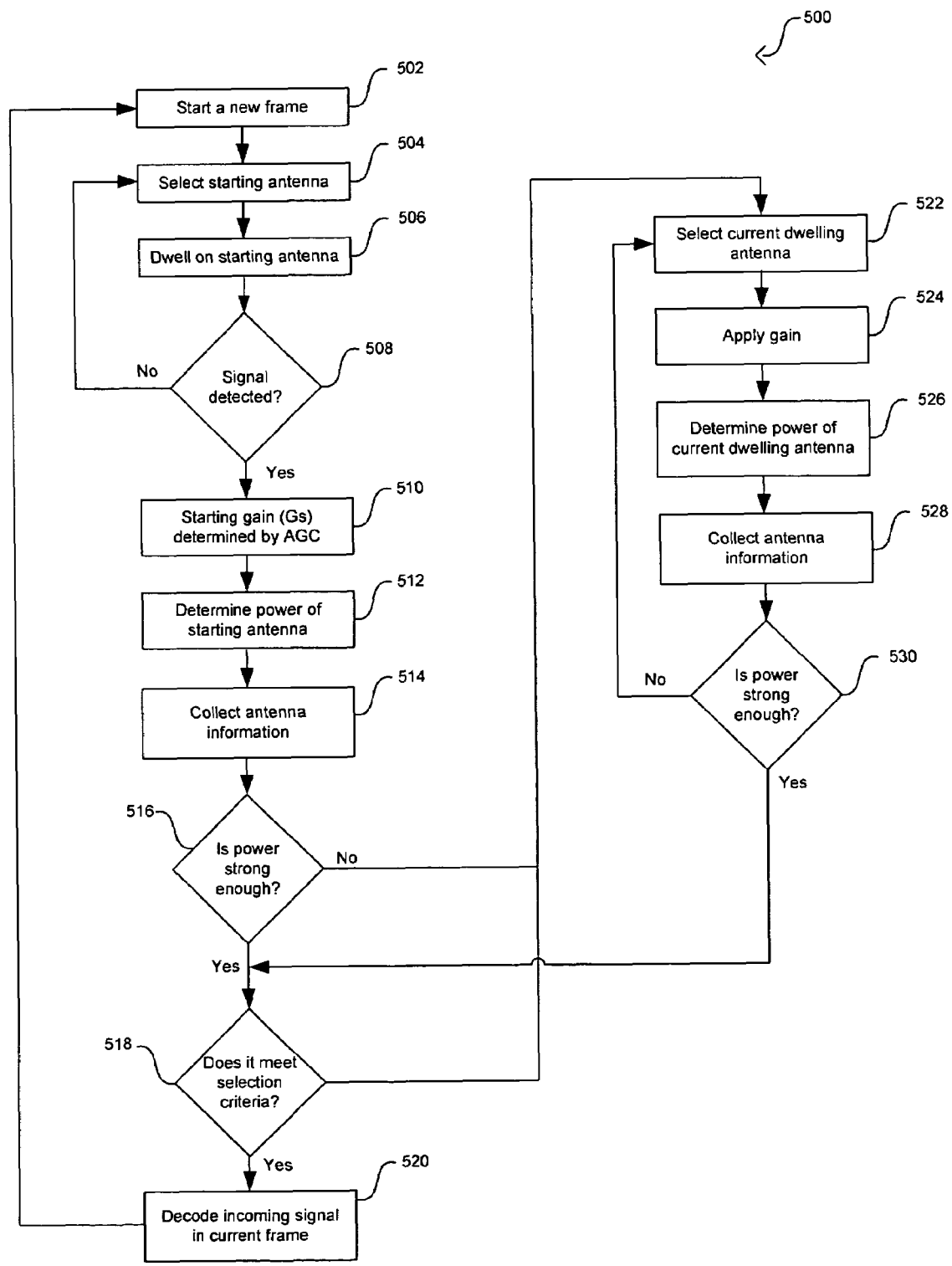
FIG. 5 is a flow chart illustrating exemplary steps that may be utilized in a receiver system for antenna selection with dynamic gain control, in accordance with an embodiment of the invention.

FIG. 5 is a flow chart illustrating exemplary steps that may be utilized in a receiver system for antenna selection with dynamic gain control, in accordance with an embodiment of the invention. Referring to FIG. 5, the receiver system 100 may start receiving a new frame in step 502. The processor 106 may select in step 504 the starting antenna based on a predetermined criteria, based on a random selection, and/or based on history of prior antenna selection. The the starting antenna may be selected based on a different selection criterion from frame-to-frame. In step 506, the processor 106 may dwell on the starting antenna for a predetermined amount of time or until an event may indicate completion of dwelling in that starting antenna. In step 508, the processor 106 may determine whether the desired signal has been detected in the starting antenna. If the signal has not been detected after a certain amount of time, or under other performance criteria, the processor 106 may select a different starting antenna and return to step 504. If the signal has been detected within predefined performance constraints, the processor 106 may proceed to step 510. In step 510, the gain $G_s$ of the starting antenna may be determined by AGC or by the processor 106. In step 512, the processor 106 may determine the estimated received power of the starting antenna or it may determine the received power of the starting antenna. In step 514, the processor 106 may collect information on the gain $G_s$ of the starting antenna, the estimated power of the starting antenna, and/or the received power of the starting antenna, and store it in the memory 108.

In step 516, the processor 106 may determine whether the signal quality metric at the starting antenna is strong enough. The signal quality metric may refer to the received power, Q, or to the estimated received power, P. To determine whether the signal quality metric is strong enough, the processor may compare the signal quality metric from step 512 to a threshold level. For example, if the signal in the starting antenna is at least 40 dB above noise, then the signal may be strong enough for detection and decoding. If the signal quality metric is determined to be adequate, then the processor 106 may proceed to step 518. In step 518, the processor 106 may determine if the signal quality metric in the starting antenna meets a selection criteria so that the starting antenna may be selected as at least one of the antennas that may be used for signal detection and signal decoding. The selection criteria may depend, for example, on the gain setting for the antenna, on the location of the antenna, on the number of antennas that may be selected, on the number or antennas that may have been dwelled on thus far, on the history of prior antenna selection, on the history of prior collected antenna information, and/or on an optimal amount of time that the receiver system 100 to detect and decode an antenna signal. If the antenna meets the selection criteria, the processor 106 may proceed to step 520 and decode the incoming signal from the selected antenna in the current frame. After decoding, the processor 106 may proceed back to step 502 and start a new information frame.

If in step 516 the signal quality metric in the starting antenna was not adequate to meet or exceed the threshold level, the processor 106 may proceed to step 522 where it may select a current dwelling antenna based on prior antenna selection history, based on a random selection, and/or based on a predetermined dwelling schedule. The processor 106 may apply a gain to the current dwelling antenna in step 524. The gain may depend on the collected gain, collected power information, and/or the power coupling factors of all antennas dwelled on by the processor 106 thus far. In the case where the only antenna dwelled on is the starting antenna, the gain in step 524 may depend on the collected gain, collected power information in step 514 and/or on the power coupling factor between the current dwelling antenna and the starting antenna. For example, the gain setting may be $G_s L_d$, where $L_d$ corresponds to the coupling factor between the current dwelling antenna and the starting antenna. In step 526, the processor 106 may determine the signal quality metric of the current dwelling antenna. The signal quality metric may correspond to the estimated received power, P, or the received power, Q, of the current dwelling antenna. In step 528, the processor 106 may collect the antenna performance information and store it in memory 108.

In step 530, the processor 106 may determine whether the signal quality metric of the current dwelling antenna is adequate. The signal quality metric may refer to the received power, Q, or to the estimated received power, P. To determine whether the signal quality metric is adequate, the processor may compare the signal quality metric from step 526 to a threshold level. The threshold level in step 530 may be the same as the threshold level in step 516 or it may be different. If the signal quality metric is not adequate, the processor 106 may return to step 522 and select a different current dwelling antenna from the remaining antennas in the receiver system 100. If the signal quality metric is adequate, the processor 106 may proceed to step 518 and determine whether the antenna performance meets or exceeds a specified selection criteria. If the current dwelling antenna meets or exceeds the selection criteria in step 520, then the processor 106 may proceed to step 520 and then to a new frame in step 502.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for controlling an antenna system, the method comprising:
   dwelling on at least one of a plurality of antennas;
   determining at least one of a plurality of signal quality metrics for said dwelled-on at least one of a plurality of antennas;
   determining a gain for said dwelled-on at least one of a plurality of antennas, wherein said gain is based on one or more power coupling parameters between said dwelled-on at least one of a plurality of antennas and one or more of a remainder of said plurality of antennas; and
   selecting for signal processing a portion of said dwelled-on at least one of a plurality of antennas based on said determined gain and said determined at least one of a plurality of signal quality metrics from said dwelled-on at least one of a plurality of antennas.

2. The method according to claim 1, comprising selecting a starting antenna from said at least one of a plurality of antennas.

3. The method according to claim 2, comprising selecting said starting antenna based on prior history of said selection of said portion of dwelled-on at least one of a plurality of antennas.

4. The method according to claim 2, comprising selecting said starting antenna based on a predetermined criteria.

5. The method according to claim 2, comprising selecting said starting antenna based on random selection.

6. The method according to claim 2, comprising determining a starting gain for said starting antenna using an automatic gain control.

7. The method according to claim 1, comprising selecting an antenna dwelling order based on a predetermined criteria.

8. The method according to claim 1, wherein said at least one of a plurality of signal quality metrics comprise at least one of the following: an estimated received power, a received power, a signal-to-noise ratio, a bit error rate, a packet error rate, a propagation channel characteristic, and/or a channel interference.

9. The method according to claim 1, comprising selecting said portion of said dwelled-on at least one of a plurality of antennas based on meeting a specified range of values for at least one of said plurality of signal quality metrics.

10. The method according to claim 1, wherein said gain is based on at least one of the following: said at least one of said plurality of signal quality metrics and a portion of said determined gain for said dwelled-on at least one of a plurality of antennas.

11. A computer readable medium having stored thereon, a computer program having at least one code section for controlling an antenna system, the at least one code section being executable by a computer for causing the computer to perform steps comprising:
dwelling on at least one of a plurality of antennas;
determining at least one of a plurality of signal quality metrics for said dwelled-on at least one of a plurality of antennas;
determining a gain for said dwelled-on at least one of a plurality of antennas, wherein said gain is based on one or more power coupling parameters between said dwelled-on at least one of a plurality of antennas and one or more of a remainder of said plurality of antennas; and
selecting for signal processing a portion of said dwelled-on at least one of a plurality of antennas based on said determined gain and said determined at least one of a plurality of signal quality metrics from said dwelled-on at least one of a plurality of antennas.

12. The computer readable medium according to claim 11, comprising code for selecting a starting antenna from said at least one of a plurality of antennas.

13. The computer readable medium according to claim 12, comprising code for selecting said starting antenna based on prior history of said selection of said portion of dwelled-on at least one of a plurality of antennas.

14. The computer readable medium according to claim 12, comprising code for selecting said starting antenna based on a predetermined criteria.

15. The computer readable medium according to claim 12, comprising code for selecting said starting antenna based on random selection.

16. The computer readable medium according to claim 12, comprising code for determining a starting gain for said starting antenna using an automatic gain control.

17. The computer readable medium according to claim 11, comprising code for selecting an antenna dwelling order based on a predetermined criteria.

18. The computer readable medium according to claim 11, wherein said at least one of a plurality of signal quality metrics comprise at least one of the following: an estimated received power, a received power, a signal-to-noise ratio, a bit error rate, a packet error rate, a propagation channel characteristic, and/or a channel interference.

19. The computer readable medium according to claim 11, comprising code for selecting said portion of said dwelled-on at least one of a plurality of antennas based on meeting a specified range of values for at least one of said plurality of signal quality metrics.

20. The computer readable medium according to claim 11, wherein said gain is based on at least one of the following: said at least one of said plurality of signal quality metrics and a portion of said determined gain for said dwelled-on at least one of a plurality of antennas.

21. A system for controlling an antenna system, the system comprising:
a processor that dwells on at least one of a plurality of antennas;
said processor determines at least one of a plurality of signal quality metrics for said dwelled-on at least one of a plurality of antennas;
said processor determines a gain of said dwelled-on at least one of a plurality of antennas, wherein said gain is based on one or more power coupling parameters between said dwelled-on at least one of a plurality of antennas and one or more of a remainder of said plurality of antennas; and
said processor selects for signal processing, a portion of said dwelled-on at least one of a plurality of antennas based on said determined gain and said determined at least one of a plurality of signal quality metrics from said dwelled-on at least one of a plurality of antennas.

22. The system according to claim 21, wherein said processor selects a starting antenna from said at least one of a plurality of antennas.

23. The system according to claim 22, wherein said processor selects said starting antenna based on prior history of said selection of said portion of dwelled-on at least one of a plurality of antennas.

24. The system according to claim 22, wherein said processor selects said starting antenna based on a predetermined criteria.

25. The system according to claim 22, wherein said processor selects said starting antenna based on random selection.

26. The system according to claim 22, wherein said processor determines a starting gain for said starting antenna using an automatic gain control.

27. The system according to claim 21, wherein said processor selects an antenna dwelling order based on a predetermined criteria.

28. The system according to claim 21, wherein said at least one of a plurality of signal quality metrics comprise at least one of the following: an estimated received power, a received power, a signal-to-noise ratio, a bit error rate, a packet error rate, a propagation channel characteristic, and/or a channel interference.

29. The system according to claim 21, wherein said processor selects said portion of said dwelled-on at least one of a plurality of antennas based on meeting a specified range of values for at least one of said plurality of signal quality metrics.

30. The system according to claim 21, wherein said gain is based on at least one of the following: said at least one of said plurality of signal quality metrics and a portion of said determined gain for said dwelled-on at least one of a plurality of antennas.

31. A method for controlling an antenna system, the method comprising:
- dwelling on at least one of a plurality of antennas;
- determining a gain for said dwelled-on at least one of a plurality of antennas;
- selecting a starting antenna from said at least one of a plurality of antennas;
- selecting said starting antenna based on prior history of selection of a portion of said dwelled-on at least one of a plurality of antennas as observed across one or more previous frames;
- determining at least one of a plurality of signal quality metrics for said dwelled-on at least one of a plurality of antennas; and
- selecting for signal processing said portion of said dwelled-on at least one of a plurality of antennas based on said determined gain and said determined at least one of a plurality of signal quality metrics from said dwelled-on at least one of a plurality of antennas.

32. The method according to claim 31, comprising selecting said starting antenna based on a predetermined criteria.

33. The method according to claim 31, comprising selecting said starting antenna based on random selection.

34. The method according to claim 31, comprising determining a starting gain for said starting antenna using an automatic gain control.

35. The method according to claim 31, comprising selecting an antenna dwelling order based on a predetermined criteria.

36. The method according to claim 31, comprising determining said at least one of said determined gain for said dwelled-on at least one of a plurality of antennas based on said at least one of a plurality of signal quality metrics, on at least one of a plurality of power coupling parameters, and/or a portion of said determined gain for said dwelled-on at least one of a plurality of antennas.

37. The method according to claim 31, wherein said at least one of a plurality of signal quality metrics comprise at least one of the following: an estimated received power, a received power, a signal-to-noise ratio, a bit error rate, a packet error rate, a propagation channel characteristic, and/or a channel interference.

38. The method according to claim 31, comprising selecting said portion of said dwelled-on at least one of a plurality of antennas based on meeting a specified range of values for at least one of said plurality of signal quality metrics.

39. A computer readable medium having stored thereon, a computer program having at least one code section for controlling an antenna system, the at least one code section being executable by a computer for causing the computer to perform steps comprising:
- dwelling on at least one of a plurality of antennas;
- determining a gain for said dwelled-on at least one of a plurality of antennas;
- selecting a starting antenna from said at least one of a plurality of antennas;
- selecting said starting antenna based on prior history of selection of a portion of said dwelled-on at least one of a plurality of antennas as observed across one or more previous frames;
- determining at least one of a plurality of signal quality metrics for said dwelled-on at least one of a plurality of antennas; and
- selecting for signal processing said portion of said dwelled-on at least one of a plurality of antennas based on said determined gain and said determined at least one of a plurality of signal quality metrics from said dwelled-on at least one of a plurality of antennas.

40. The computer readable medium according to claim 39, comprising code for selecting said starting antenna based on a predetermined criteria.

41. The computer readable medium according to claim 39, comprising code for selecting said starting antenna based on random selection.

42. The computer readable medium according to claim 39, comprising code for determining a starting gain for said starting antenna using an automatic gain control.

43. The computer readable medium according to claim 39, comprising code for selecting an antenna dwelling order based on a predetermined criteria.

44. The computer readable medium according to claim 39, comprising code for determining said at least one of said determined gain for said dwelled-on at least one of a plurality of antennas based on said at least one of a plurality of signal quality metrics, on at least one of a plurality of power coupling parameters, and/or a portion of said determined gain for said dwelled-on at least one of a plurality of antennas.

45. The computer readable medium according to claim 39, wherein said at least one of a plurality of signal quality metrics comprise at least one of the following: an estimated received power, a received power, a signal-to-noise ratio, a bit error rate, a packet error rate, a propagation channel characteristic, and/or a channel interference.

46. The computer readable medium according to claim 39, comprising code for selecting said portion of said dwelled-on at least one of a plurality of antennas based on meeting a specified range of values for at least one of said plurality of signal quality metrics.

47. A system for controlling an antenna system, the system comprising:
- a processor that dwells on at least one of a plurality of antennas;
- said processor determines a gain for said dwelled-on at least one of a plurality of antennas;
- said processor selects a starting antenna from said at least one of a plurality of antennas;
- said processor selects said starting antenna based on prior history of selection of a portion of said dwelled-on at least one of a plurality of antennas as observed across one or more previous frames;
- said processor determines at least one of a plurality of signal quality metrics for said dwelled-on at least one of a plurality of antennas; and
- said processor selects for signal processing said portion of said dwelled-on at least one of a plurality of antennas based on said determined gain and said determined at least one of a plurality of signal quality metrics from said dwelled-on at least one of a plurality of antennas.

48. The system according to claim 47, wherein said processor selects said starting antenna based on a predetermined criteria.

49. The system according to claim 47, wherein said processor selects said starting antenna based on random selection.

50. The system according to claim 47, wherein said processor determines a starting gain for said starting antenna using an automatic gain control.

51. The system according to claim 47, wherein said processor selects an antenna dwelling order based on a predetermined criteria.

52. The system according to claim 47, wherein said processor determines said at least one of said determined gain for said dwelled-on at least one of a plurality of antennas based on said at least one of a plurality of signal quality metrics, on at least one of a plurality of power coupling parameters, and/or a portion of said determined gain for said dwelled-on at least one of a plurality of antennas.

53. The system according to claim 47, wherein said at least one of a plurality of signal quality metrics comprise at least one of the following: an estimated received power, a received power, a signal-to-noise ratio, a bit error rate, a packet error rate, a propagation channel characteristic, and/or a channel interference.

54. The system according to claim 47, wherein said processor selects said portion of said dwelled-on at least one of a plurality of antennas based on meeting a specified range of values for at least one of said plurality of signal quality metrics.

* * * * *